(12) United States Patent
Nishikawa (10) Patent No.: US 11,934,573 B2
(45) Date of Patent: Mar. 19, 2024

(54) DISPLAY CONTROL APPARATUS AND DISPLAY CONTROL METHOD

(71) Applicant: MITSUBISHI ELECTRIC CORPORATION, Tokyo (JP)

(72) Inventor: Yasuhiro Nishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/801,948

(22) PCT Filed: Jun. 1, 2020

(86) PCT No.: PCT/JP2020/021565
§ 371 (c)(1),
(2) Date: Aug. 24, 2022

(87) PCT Pub. No.: WO2021/245729
PCT Pub. Date: Dec. 9, 2021

(65) Prior Publication Data
US 2023/0116244 A1    Apr. 13, 2023

(51) Int. Cl.
*G06F 3/01* (2006.01)
*G06F 3/0485* (2022.01)

(52) U.S. Cl.
CPC ............ *G06F 3/013* (2013.01); *G06F 3/0485* (2013.01)

(58) Field of Classification Search
CPC .......... G06F 3/01; G06F 3/013; G06F 3/0362; G06F 3/04847; G06F 3/0485; G06F 2203/04806; G06F 3/038; G06F 3/048; G06F 3/0481; G06F 3/0482; G06F 3/0488; G06T 7/20; G06T 7/00; G10L 25/21;
(Continued)

(56) References Cited

U.S. PATENT DOCUMENTS

| 9,377,852 B1* | 6/2016 | Shapiro ................. G06F 3/0482 |
| 2015/0185834 A1* | 7/2015 | Wingrove ............... G06F 3/013 345/156 |
| 2020/0319705 A1* | 10/2020 | Rohrbacher ........ G06F 3/04842 |

FOREIGN PATENT DOCUMENTS

| JP | 2016-157220 A | 9/2016 |
| JP | 2017-167681 A | 9/2017 |

(Continued)

OTHER PUBLICATIONS

International Search Report for PCT/JP2020/021565 (PCT/ISA/210) dated Jul. 21, 2020.
(Continued)

*Primary Examiner* — Nelson M Rosario
(74) *Attorney, Agent, or Firm* — Birch, Stewart, Kolasch & Birch, LLP (57) ABSTRACT

It is an object to provide technology enabling appropriate control of a change of a parameter per operation unit. A display control apparatus is a display control apparatus to control a display apparatus, and includes: an acquisition unit to acquire a change operation to change a parameter used for an image displayed by the display apparatus from a user, and acquire a gaze of the user; and a controller to control a change of the parameter per operation unit being a unit of the change operation based on a result of gaze determination to determine whether the gaze is directed toward the image displayed by the display apparatus.

10 Claims, 7 Drawing Sheets

(58) Field of Classification Search
CPC . G10L 25/90; G01D 7/00; G01D 7/04; B60K 35/00; B60R 16/02; B60W 50/08
See application file for complete search history.

(56) References Cited

FOREIGN PATENT DOCUMENTS

| | | |
|---|---|---|
| JP | 2019-168837 A | 10/2019 |
| JP | 2020-29221 A | 2/2020 |

OTHER PUBLICATIONS

Written Opinion of the International Searching Authority for PCT/JP2020/021565 (PCT/ISA/237) dated Jul. 21, 2020.
Japanese Decision of Refusal dated Oct. 17, 2023 for Application No. 2022-529131 with an English translation.
Japanese Office Action for Japanese Application No. 2022-529131, dated Jul. 4, 2023, with an English translation.

* cited by examiner

| GAZE | DIRECTED TOWARD DISPLAY IMAGE | | NOT DIRECTED TOWARD DISPLAY IMAGE | |
|---|---|---|---|---|
| SPEED OF CHANGE OPERATION | EQUAL TO OR GREATER THAN THRESHOLD | SMALLER THAN THRESHOLD | EQUAL TO OR GREATER THAN THRESHOLD | SMALLER THAN THRESHOLD |
| CHANGE OF PARAMETER PER OPERATION UNIT | (i) NORMAL CHANGE | (ii) NORMAL CHANGE | (iv) SKIP CHANGE | (iii) NORMAL CHANGE |

| TIME | PAST | | | | | | | | | → PRESENT |
|---|---|---|---|---|---|---|---|---|---|---|
| GAZE | ... | OUT | OUT | OUT | OUT | OUT | IN | OUT | IN | OUT | OUT | OUT |
| SPEED OF CHANGE OPERATION | ... | LARGE | LARGE | LARGE | SMALL | LARGE | LARGE | LARGE | SMALL | LARGE | LARGE | LARGE |

FIG. 9

| TIME | PAST | | | | → PRESENT | | |
|---|---|---|---|---|---|---|---|
| GAZE | OUT | OUT | OUT | IN | OUT | → | OUT |
| SPEED OF CHANGE OPERATION | LARGE | LARGE | LARGE | LARGE | LARGE | | LARGE |

FIG. 10

| TIME | PAST | | | | → PRESENT | | |
|---|---|---|---|---|---|---|---|
| GAZE | OUT | OUT | OUT | OUT | OUT | → | OUT |
| SPEED OF CHANGE OPERATION | LARGE | LARGE | SMALL | LARGE | LARGE | | LARGE |

FIG. 11

| TIME | PAST | | | | → PRESENT | | |
|---|---|---|---|---|---|---|---|
| GAZE | OUT | OUT | IN | IN | OUT | → | OUT |
| SPEED OF CHANGE OPERATION | LARGE | SMALL | SMALL | LARGE | LARGE | | LARGE |

DISPLAY CONTROL APPARATUS AND DISPLAY CONTROL METHOD

TECHNICAL FIELD

The present disclosure relates to display control apparatuses and display control methods.

BACKGROUND ART

A display control apparatus, such as a navigation apparatus, uses parameters inside the apparatus for a location of a map, frequency for radio, and the like displayed by a display apparatus. When such a display control apparatus receives a change operation to change a parameter, the parameter is changed, and, as a result, the map is moved, or the frequency is increased or decreased, for example. On the other hand, technology disclosed in Patent Document 1 proposes digital signage that changes a scroll speed of scroll display based on whether a gaze is directed toward a display apparatus, for example.

PRIOR ART DOCUMENTS

Patent Document

Patent Document 1: Japanese Patent Application Laid-Open No. 2017-167681

SUMMARY

Problem to be Solved by the Invention

In conventional technology, a change of a parameter per operation unit being a unit of a change operation is constant, and thus movement of a map and an increase or a decrease of frequency per operation unit are constant. In practice, however, a user sometimes desires to reduce the change of the parameter per operation unit to reduce the movement of the map and the increase or decrease of frequency per operation unit. In contrast, the user sometimes desires to increase the change of the parameter per operation unit to increase the movement of the map and the increase or decrease of frequency per operation unit.

The present disclosure has been conceived in view of a problem as described above, and it is an object of the present disclosure to provide technology enabling appropriate control of a change of a parameter per operation unit.

Means to Solve the Problem

A display control apparatus according to the present disclosure includes: an acquisition unit to acquire a change operation to change a parameter used for an image displayed by a display apparatus from a user, and acquire a gaze of the user; and a controller to control a change of the parameter per operation unit being a unit of the change operation based on a result of gaze determination to determine whether the gaze is directed toward the image displayed by the display apparatus.

Effects of the Invention

According to the present disclosure, the change of the parameter per operation unit being the unit of the change operation is controlled based on the result of the gaze determination to determine whether the gaze is directed toward the image displayed by the display apparatus, so that the change of the parameter per operation unit can appropriately be controlled.

The objects, features, aspects, and advantages of the present disclosure will become more apparent from the following detailed description and the accompanying drawings.

DESCRIPTION OF EMBODIMENTS

Embodiment 1

Figure 1:
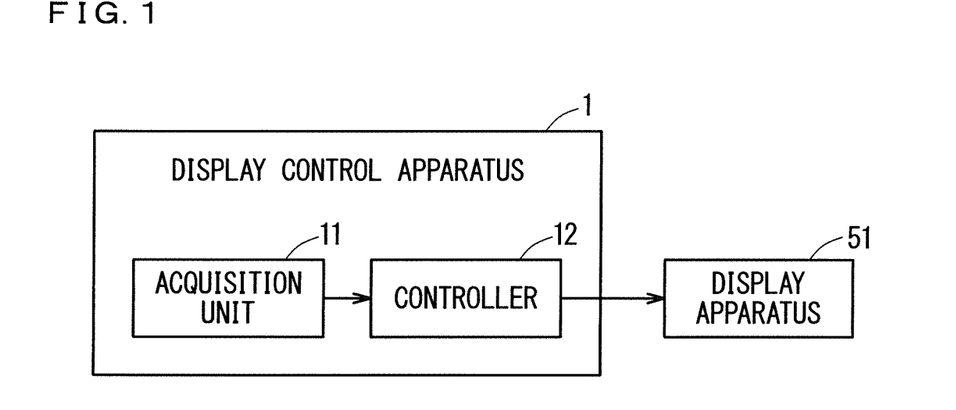
FIG. 1 is a block diagram showing a configuration of a display control apparatus according to Embodiment 1.

FIG. 1 is a block diagram showing a configuration of a display control apparatus 1 according to Embodiment 1. The display control apparatus 1 in FIG. 1 is connected to a display apparatus 51 by wire or wirelessly.

The display apparatus 51 is controlled by the display control apparatus 1 to display various images. Images displayed by the display apparatus 51 are hereinafter also referred to as "display images". Examples of the display apparatus 51 include a liquid crystal display and a head-up display (HUD). The display apparatus 51 may be included in the display control apparatus 1, or may not be included in the display control apparatus 1. The display apparatus 51 and the display control apparatus 1 may be mounted on a vehicle, or may not be mounted on the vehicle.

The display control apparatus 1 in FIG. 1 includes an acquisition unit 11 and a controller 12.

The acquisition unit 11 acquires a change operation to change a parameter used for a display image from a user. In a case where the display image is a map, for example, the parameter changed by the change operation includes a parameter used to move the map. In a case where the display image is names of facilities and addresses listed alphabetically, for example, the parameter changed by the change operation includes a parameter to move (change) a name. In a case where the display image is frequency for radio, for example, the parameter changed by the change operation includes a parameter used to change the frequency.

A touch panel, a rotary switch, interfaces thereof, and the like are used to perform a function of the acquisition unit 11 of acquiring the change operation. In a case where the touch panel is used as the acquisition unit 11, for example, a scroll operation, such as a flick, on the touch panel is used as the change operation. In a case where the rotary switch is used as the acquisition unit 11, for example, an operation to rotate the rotary switch is used as the change operation.

The acquisition unit 11 acquires a gaze of the user. A camera to capture an image of a face of the user, an image recognition apparatus to perform image recognition processing on the image of the face to acquire the gaze of the user, user interfaces thereof, and the like are used to perform a function of the acquisition unit 11 of acquiring the gaze.

The controller 12 makes gaze determination to determine whether the gaze acquired by the acquisition unit 11 is directed toward the display image displayed by the display apparatus 51. The controller 12 also controls a change of the parameter per operation unit being a unit of the change operation based on a result of the gaze determination. For example, the controller 12 sets a normal change A1 to the change of the parameter per operation unit when the gaze is directed toward the display image, and sets a skip change A2 greater than the normal change A1 to the change of the parameter per operation unit when the gaze is not directed toward the display image.

The controller 12 changes the parameter based on the change operation acquired by the acquisition unit 11 and the change of the parameter per operation unit. When the change operation acquired by the acquisition unit 11 is B times the operation unit, and the normal change A1 is set to the change of the parameter per operation unit, for example, the controller 12 changes the parameter by A1×B. When the change operation acquired by the acquisition unit 11 is B times the operation unit, and the skip change A2 is set to the change of the parameter per operation unit, for example, the controller 12 changes the parameter by A2×B. When the controller 12 changes the parameter, the display image displayed by the display apparatus 51 is changed, for example, the map is moved.

<Operation>

Figure 2:
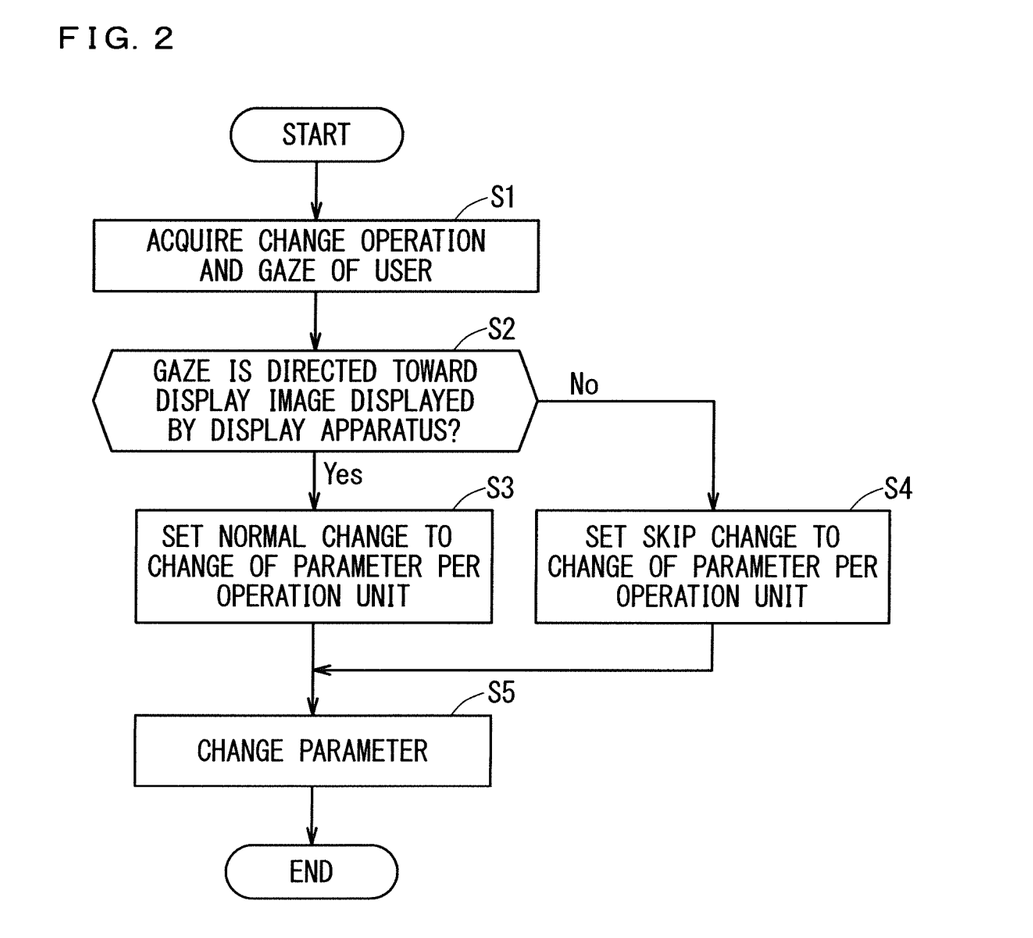
FIG. 2 is a flowchart showing operation of the display control apparatus according to Embodiment 1.

FIG. 2 is a flowchart showing operation of the display control apparatus 1 according to Embodiment 1.

First, in step S1, the acquisition unit 11 acquires the change operation and the gaze of the user.

In step S2, the controller 12 makes the gaze determination to determine whether the gaze acquired by the acquisition unit 11 is directed toward the display image displayed by the display apparatus 51. Processing proceeds to step S3 when it is determined that the gaze is directed toward the display image displayed by the display apparatus 51, and proceeds to step S4 when it is determined that the gaze is not directed toward the display image displayed by the display apparatus 51.

In step S3, the controller 12 sets the normal change to the change of the parameter per operation unit. Processing then proceeds to step S5.

In step S4, the controller 12 sets the skip change to the change of the parameter per operation unit. Processing then proceeds to step S5.

In step S5, the controller 12 changes the parameter based on the change operation acquired by the acquisition unit 11 and the change of the parameter per operation unit. Operation in FIG. 2 then ends.

Summary of Embodiment 1

According to the display control apparatus 1 according to Embodiment 1 as described above, the change of the parameter per operation unit is controlled based on the result of the gaze determination to determine whether the gaze is directed toward the display image displayed by the display apparatus. According to such a configuration, even if the amount of the change operation is the same, the change of the parameter when the gaze is not directed toward the display image displayed by the display apparatus 51 can be greater than the change of the parameter when the gaze is directed toward the display image displayed by the display apparatus 51.

In a case where the user tries to move the map displayed by the display apparatus 51 by a large amount, for example, movement of the map per operation unit of the scroll operation can be increased when the user performs the scroll operation while not directing the gaze toward the map. This can reduce the number of repetitions and time of the scroll operation. This is particularly effective for an apparatus used in situations where attention of the user is required to be directed toward something other than the display image, for example, as the user can be prompted to concentrate on driving.

In a case where the user tries to move the map displayed by the display apparatus 51 by a small amount, for example, the movement of the map per operation unit of the scroll operation can be reduced when the user performs the scroll operation while directing the gaze toward the map. The user can thus finely and carefully move the map while viewing the map.

Embodiment 2

Figure 3:
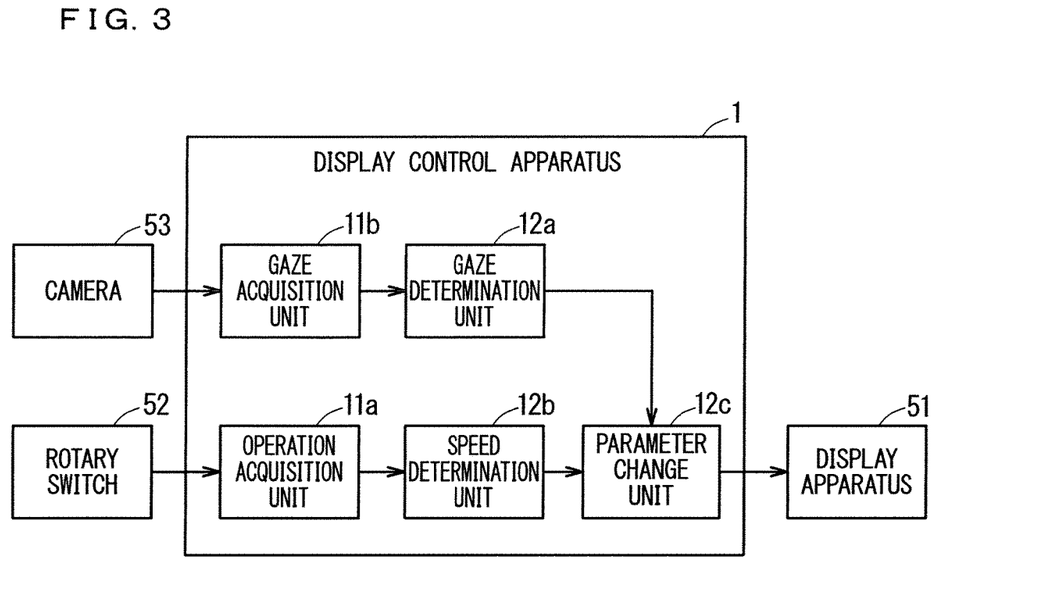
FIG. 3 is a block diagram showing a configuration of a display control apparatus according to Embodiment 2.

FIG. 3 is a block diagram showing a configuration of the display control apparatus 1 according to Embodiment 2. Components according to Embodiment 2 that are the same as or similar to the above-mentioned components bear reference signs that are the same as or similar to those of the above-mentioned components, and different components will mainly be described below.

The display control apparatus 1 in FIG. 3 is connected not only to the display apparatus 51 but also to a rotary switch 52 and a camera 53 by wire or wirelessly. The display apparatus 51 is similar to the display apparatus 51 described in Embodiment 1.

Figure 4:
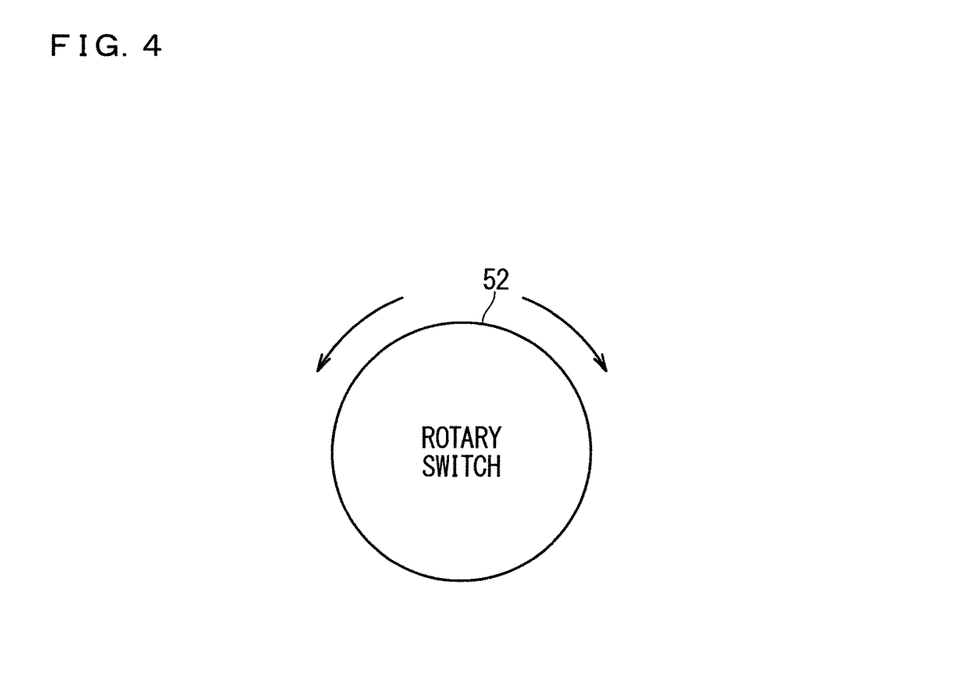
FIG. 4 is a schematic diagram showing a rotary switch according to Embodiment 2.

FIG. 4 is a schematic diagram showing the rotary switch 52. The rotary switch 52 can be rotated clockwise and counterclockwise, and receives a rotation operation to rotate itself from the user. The camera 53 in FIG. 3 captures an image of a face of the user.

A configuration of the display control apparatus 1 will be described next. The display control apparatus 1 in FIG. 3 includes an operation acquisition unit 11*a*, a gaze acquisition unit 11*b*, a gaze determination unit 12*a*, a speed determination unit 12*b*, and a parameter change unit 12*c*. The operation acquisition unit 11*a* and the gaze acquisition unit 11*b* in FIG. 3 are included in the concept of the acquisition unit 11 in FIG. 1, and the gaze determination unit 12*a*, the speed determination unit 12*b*, and the parameter change unit 12*c* in FIG. 3 are included in the concept of the controller 12 in FIG. 1.

The operation acquisition unit 11*a* acquires the change operation based on the rotation operation received by the rotary switch 52. Description will be made below based on the assumption that the operation acquisition unit 11*a* acquires a rotation operation to rotate the rotary switch 52 clockwise 10° per sampling period of the rotary switch 52 (e.g., 0.2 seconds) as the change operation of an operation unit (hereinafter also abbreviated to "a unit") in a forward direction. According to such a configuration, when a rotation operation to rotate the rotary switch 52 clockwise 90° per sampling period is received, for example, the operation acquisition unit 11*a* acquires the change operation of nine units in the forward direction based on the rotation operation. When a rotation operation to rotate the rotary switch 52 counterclockwise 60° per sampling period is received, for example, the operation acquisition unit 11*a* acquires the change operation of six units in a reverse direction based on the rotation operation. A period and an angle to define the change operation of the operation unit are not limited to those described above.

The gaze acquisition unit 11*b* performs the image recognition processing on the image captured by the camera 53 to acquire the gaze of the user. For example, the gaze acquisition unit 11*b* acquires the gaze of the user based on the location of the cornea of the eye relative to the entire eye in the image of the face.

The gaze determination unit 12*a* makes the gaze determination to determine whether the gaze acquired by the gaze acquisition unit 11*b* is directed toward the display image displayed by the display apparatus 51. Description will be made below based on the assumption that the gaze determination unit 12*a* determines that the gaze is directed toward the display image when the gaze is included in a range corresponding to the display image, and determines that the gaze is not directed toward the display image when the gaze is not included in the range. The gaze determination is not limited to that described above. For example, the gaze determination unit 12*a* may determine that the gaze is directed toward the display image when the gaze is included in a range corresponding to the entire screen of the display apparatus 51, and may determine that the gaze is not directed toward the display image when the gaze is not included in the range.

The speed determination unit 12*b* makes speed determination to determine whether a speed of the change operation acquired by the operation acquisition unit 11*a* is equal to or greater than a predetermined threshold. Description will be made below based on the assumption that the speed determination unit 12*b* determines that the speed is equal to or greater than the threshold when the change operation acquired per sampling period is equal to or greater than the change operation of three units, and determines that the speed is smaller than the threshold when the change operation is smaller than the change operation of three units. A period and a threshold based on which the speed is determined are not limited to those described above.

The parameter change unit 12*c* controls the change of the parameter per operation unit based on the result of the gaze determination made by the gaze determination unit 12*a* and the result of the speed determination made by the speed determination unit 12*b*.

Figure 5:
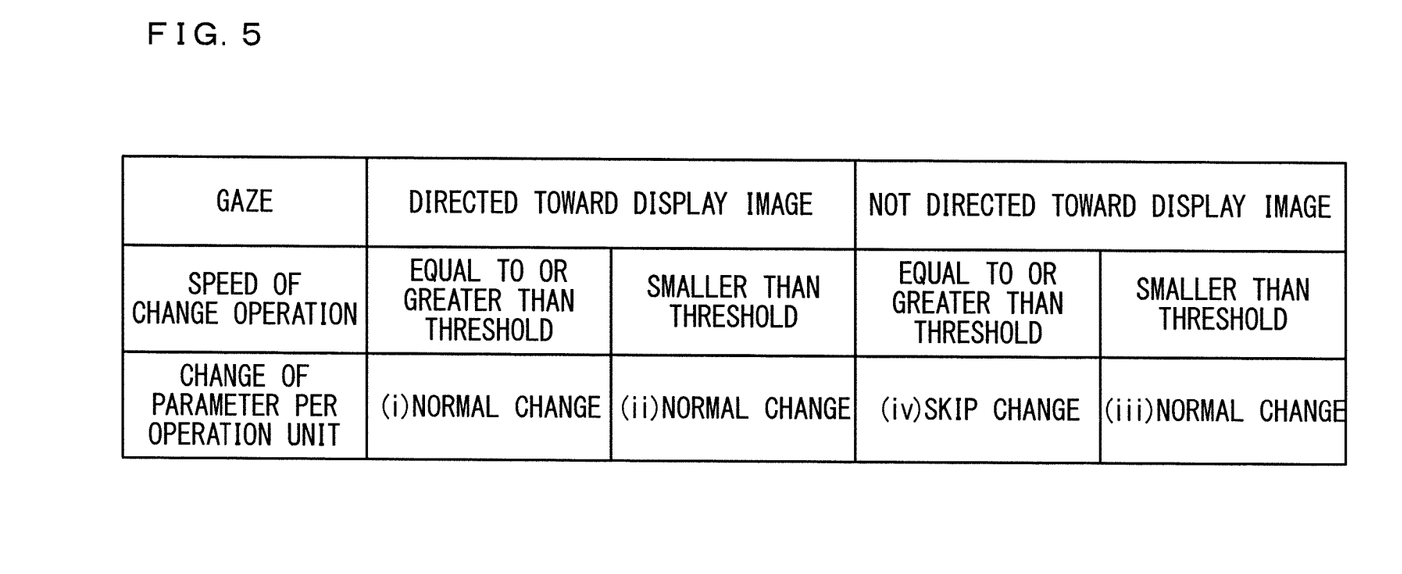
FIG. 5 is a diagram for describing change control performed by the display control apparatus according to Embodiment 2.

FIG. 5 is a diagram for describing control of the change of the parameter per operation unit performed by the parameter change unit 12*c* according to Embodiment 2.

The parameter change unit 12*c* according to Embodiment 2 sets the normal change to the change of the parameter per operation unit when it is not determined that the gaze is not directed toward the display image, and the speed of the change operation is equal to or greater than the threshold. That is to say, the normal change is set to the change of the parameter per operation unit (i) when the gaze is directed toward the display image, and the speed of the change operation is equal to or greater than the threshold, (ii) when the gaze is directed toward the display image, and the speed of the change operation is smaller than the threshold, and (iii) when the gaze is not directed toward the display image, and the speed of the change operation is smaller than the threshold.

On the other hand, the parameter change unit 12*c* according to Embodiment 2 sets the skip change greater than the normal change to the change of the parameter per operation unit (iv) when it is determined that the gaze is not directed toward the display image, and the speed of the change operation is equal to or greater than the threshold. A case where the skip change is twice the normal change will be described below as an example.

Figure 6:
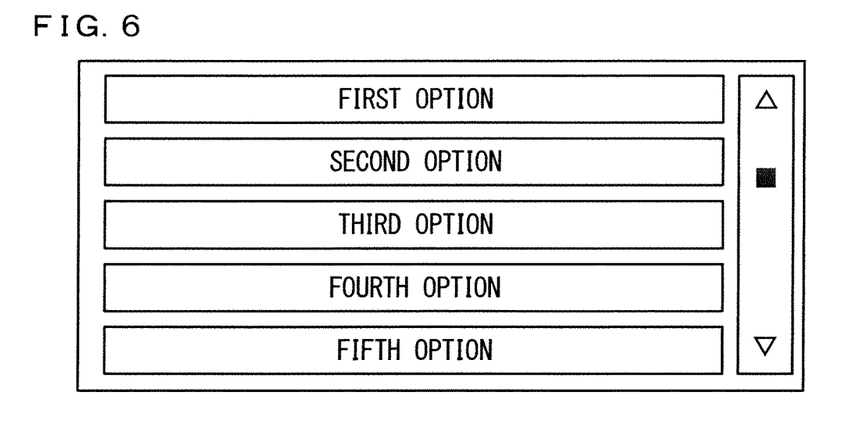
FIG. 6 is a diagram for describing a change of a parameter performed by the display control apparatus according to Embodiment 2.

FIG. 6 is a diagram for describing the change of the parameter performed by the parameter change unit 12*c*. The parameter change unit 12*c* changes the parameter based on the change operation acquired by the operation acquisition unit 11*a* and the change of the parameter per operation unit.

Assume that the rotary switch 52 is rotated clockwise 20° per sampling period when a first option in FIG. 6 is a candidate for selection due to addition of a cursor and the like, for example. In this case, the operation acquisition unit 11*a* acquires the change operation of two units, and it is determined that the speed of the change operation is smaller than the threshold. In this case, the parameter change unit 12*c* sets the normal change to the change of the parameter per operation unit by the change control in FIG. 5 regardless of whether the gaze is directed toward the display image, and thus changes the parameter by two (=2×1). As a result, a state transitions to a state in which a third option obtained by moving from the first option in FIG. 6 by two is the candidate for selection.

Assume that the rotary switch 52 is rotated clockwise 40° per sampling period when the first option in FIG. 6 is the candidate for selection due to addition of the cursor and the like, for example. In this case, the operation acquisition unit 11*a* acquires the change operation of four units, and it is determined that the speed of the change operation is equal to or greater than the threshold. When it is determined that the gaze is directed toward the display image in this case, the parameter change unit 12*c* sets the normal change to the change of the parameter per operation unit by the change control in FIG. 5, and thus changes the parameter by four (=4×1). As a result, the state transitions to a state in which a fifth option obtained by moving from the first option in FIG. 6 by four is the candidate for selection. On the other hand, when it is determined that the gaze is not directed toward the display image in the above-mentioned case, the parameter change unit 12*c* sets the skip change to the change of the parameter per operation unit by the change control in FIG. 5, and thus changes the parameter by eight (=4×2). As a result, the state transitions to a state in which a ninth option (not shown) obtained by moving from the first option in FIG. 6 by eight is the candidate for selection.

<Operation>

Figure 7:
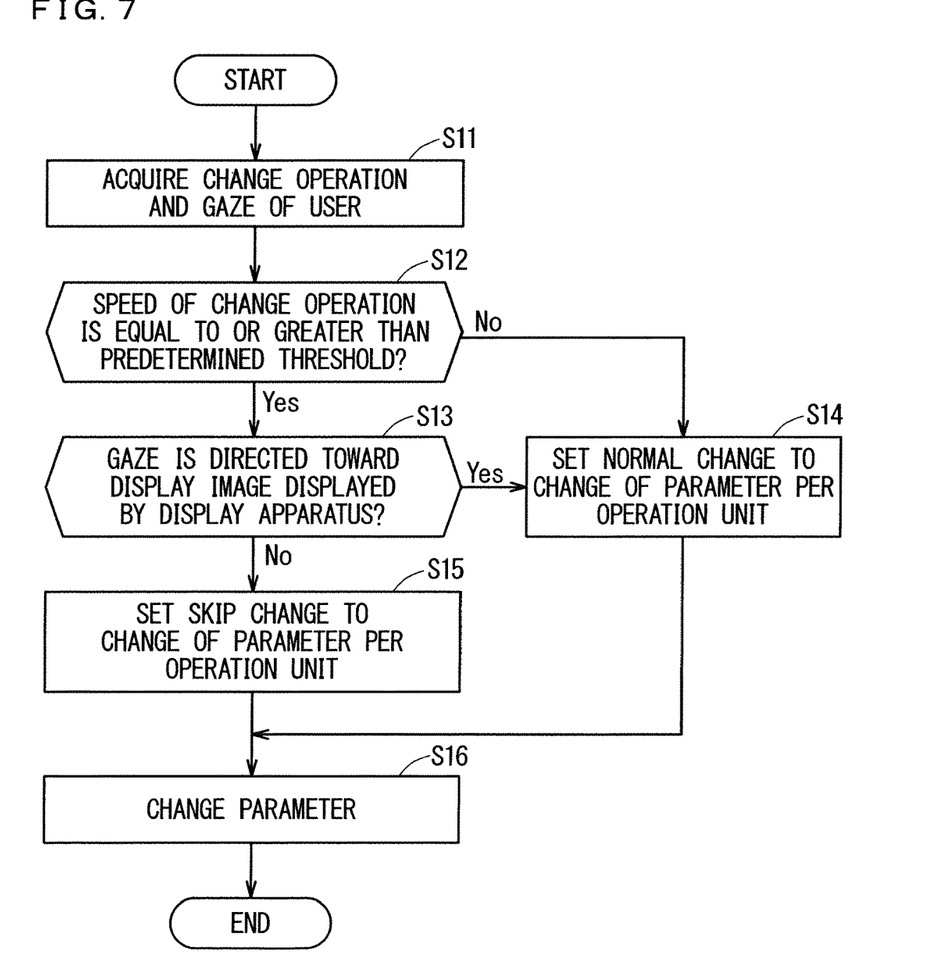
FIG. 7 is a flowchart showing operation of the display control apparatus according to Embodiment 2.

FIG. 7 is a flowchart showing operation of the display control apparatus 1 according to Embodiment 2.

First, in step S11, the operation acquisition unit 11a acquires the change operation based on the rotation operation received by the rotary switch 52. The gaze acquisition unit 11b performs the image recognition processing on the image captured by the camera 53 to acquire the gaze of the user.

In step S12, the speed determination unit 12b makes the speed determination to determine whether the speed of the change operation acquired by the operation acquisition unit 11a is equal to or greater than the predetermined threshold. Processing proceeds to step S13 when it is determined that the speed of the change operation is equal to or greater than the predetermined threshold, and proceeds to step S14 when it is determined that the speed of the change operation is smaller than the predetermined threshold.

In step S13, the gaze determination unit 12a makes the gaze determination to determine whether the gaze acquired by the gaze acquisition unit 11b is directed toward the display image displayed by the display apparatus 51. Processing proceeds to step S14 when it is determined that the gaze is directed toward the display image displayed by the display apparatus 51, and proceeds to step S15 when it is determined that the gaze is not directed toward the display image displayed by the display apparatus 51.

In step S14, the parameter change unit 12c sets the normal change to the change of the parameter per operation unit. Processing then proceeds to step S16.

In step S15, the parameter change unit 12c sets the skip change to the change of the parameter per operation unit. Processing then proceeds to step S16.

In step S16, the parameter change unit 12c changes the parameter based on the change operation acquired by the operation acquisition unit 11a and the change of the parameter per operation unit. Operation in FIG. 7 then ends.

Summary of Embodiment 2

According to the display control apparatus 1 according to Embodiment 2 as described above, the change of the parameter per operation unit is controlled based on the result of the gaze determination and the result of the speed determination. According to such a configuration, the change of the parameter can be increased when the gaze is not directed toward the display image, and the speed of the change operation is equal to or greater than the threshold. The change of the parameter can be reduced when the gaze is not directed toward the display image, and the speed of the change operation is smaller than the threshold. According to such a configuration, the user accustomed to the change operation can make fine adjustment of the parameter without directing the gaze toward the display image.

Modifications of Embodiment 2

While the change operation is the rotation operation to rotate the rotary switch 52, the display image is the options in FIG. 6, and the parameter is used for one-dimensional movement within options in Embodiment 2, the change operation, the display image, and the parameter are not limited to those in Embodiment 2. As described in Embodiment 1, the change operation may be the scroll operation, such as the flick, on the touch panel, the display image may be the map, and the parameter may be used for two-dimensional movement of the map, for example. In this configuration, the speed determination unit 12b may determine that the speed of the change operation is equal to or greater than the predetermined threshold when three or more flicks are acquired as the change operation per second.

In Embodiment 2, the parameter change unit 12c controls the change of the parameter per operation unit based on the results of the gaze determination and the speed determination, that is, the determination results (i) to (iv) in FIG. 5. The normal change is set to the change of the parameter per operation unit in the determination results (i) to (iii) in FIG. 5, and the skip change is set to the change of the parameter per operation unit in the determination result (iv) in FIG. 5. That is to say, the change of the parameter per operation unit in the determination results (i) to (iv) in FIG. 5 includes two changes including the normal change and the skip change, but is not limited to the two changes, and may include three changes or four changes.

Embodiment 3

A block diagram showing a configuration of the display control apparatus 1 according to Embodiment 3 is similar to the block diagram (FIG. 3) according to Embodiment 2. Components according to Embodiment 3 that are the same as or similar to the above-mentioned components bear reference signs that are the same as or similar to those of the above-mentioned components, and different components will mainly be described below.

Figure 8:
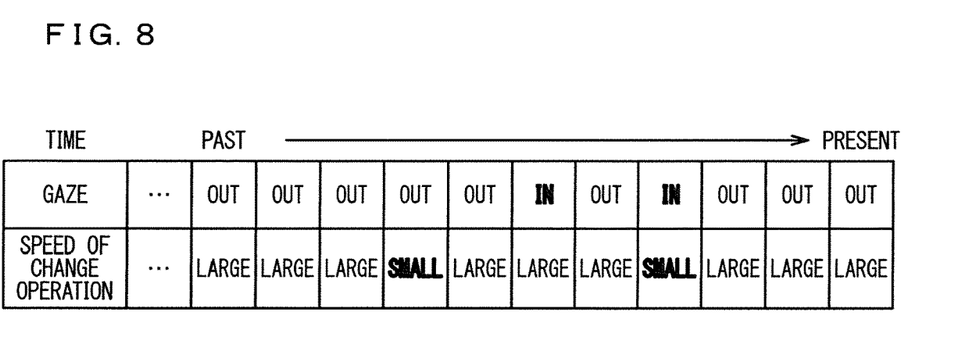
FIG. 8 is a diagram showing an example of results of gaze determination and speed determination.

FIG. 8 is a diagram showing an example of results of the gaze determination and the speed determination arranged in chronological order. A term "IN" in a row "GAZE" indicates a result of the gaze determination that the gaze is directed toward the display image (hereinafter referred to as an in-determination result), and a term "OUT" in the row "GAZE" indicates a result of the gaze determination that the gaze is not directed toward the display image (hereinafter referred to as an out-determination result). A term "LARGE" in a row "SPEED" indicates a result of the speed determination that the speed of the change operation is equal to or greater than the threshold (hereinafter referred to as a large-determination result), and a term "SMALL" in the row "SPEED" indicates a result of the speed determination that the speed of the change operation is smaller than the threshold (hereinafter referred to as a small-determination result). The term "LARGE" in the row "SPEED" corresponds to a case where the amount of the change operation per sampling period is equal to or greater than a threshold, and the term "SMALL" in the row "SPEED" corresponds to a case where the amount of the change operation is smaller than the threshold.

The display control apparatus 1 according to Embodiment 2 described above is configured to control the change of the parameter per operation unit based on the results ((i) to (iv) in FIG. 5) of the gaze determination and the speed determination per sampling period. In such a configuration, however, control based on the determination result (iv) sometimes cannot continuously be performed when the gaze is unintentionally directed toward the display image and when it is difficult to continuously perform the rotation operation on the rotary switch 52 at an angle exceeding a certain angle, for example.

That is to say, even if the user intends to perform control based on the determination result (iv) at each time point in FIG. 8, the control sometimes cannot be performed due to failure to obtain the determination result (iv) (the out-determination result and the large-determination result) at each time point. In Embodiment 3 described below, the control based on each of the determination results (i) to (iv) can be performed as continuously as possible.

In Embodiment 3, the gaze determination and the speed determination are made at least at a plurality of time points within a predetermined time period, and the parameter change unit 12c stores determination results at the plurality of time points. Description will be made below based on the assumption that the predetermined time period is one second from a current time point, and the plurality of time points are time points at intervals of 0.2 seconds (five samples). The predetermined time period and the plurality of time points are not limited to those described above.

Figure 9:
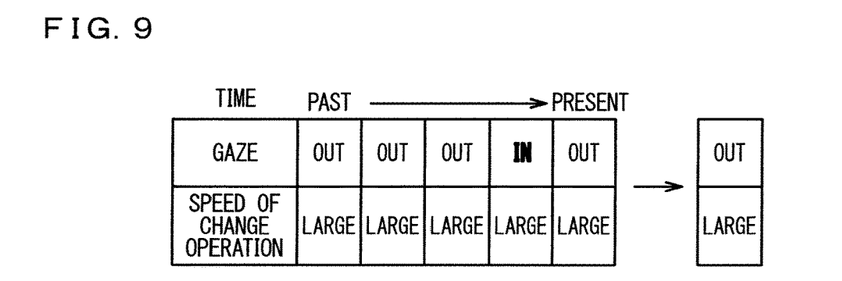
FIG. 9 is a diagram for describing change control performed by a display control apparatus according to Embodiment 3.

FIG. 9 is a diagram for describing the control of the change of the parameter per operation unit performed by the parameter change unit 12c according to Embodiment 3.

The parameter change unit 12c controls the change of the parameter per operation unit based on the number of times it is determined that the gaze is directed toward the display image (an in-determination number) and the number of times it is determined that the gaze is not directed toward the display image (an out-determination number) within the predetermined time period. As an example, in Embodiment 3, the parameter change unit 12c determines that the in-determination result has been obtained at each time point within the predetermined time period when the in-determination number is greater than the out-determination number within the predetermined time period. On the other hand, the parameter change unit 12c determines that the out-determination result has been obtained at each time point within the predetermined time period when the out-determination number is greater than the in-determination number within the predetermined time period.

In a case of FIG. 9, the in-determination number is one, and the out-determination number is four, so that the parameter change unit 12c determines that the out-determination result has been obtained at each time point within the predetermined time period (five samples).

Figure 10:
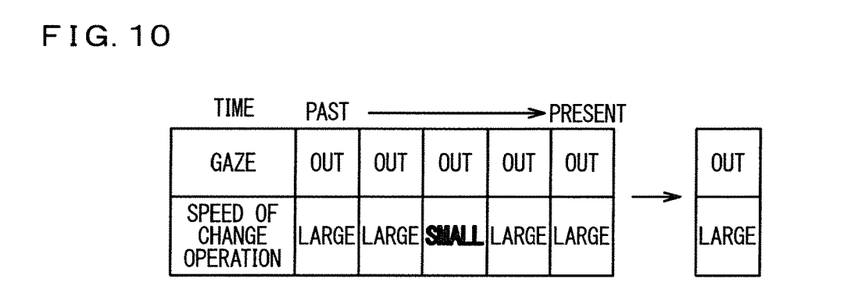
FIG. 10 is a diagram for describing change control performed by the display control apparatus according to Embodiment 3.

FIG. 10 is a diagram for describing the control of the change of the parameter per operation unit performed by the parameter change unit 12c according to Embodiment 3.

The parameter change unit 12c controls the change of the parameter per operation unit based on the number of times it is determined that the speed of the change operation is equal to or greater than the threshold (a large-determination number) and the number of times it is determined that the speed of the change operation is smaller than the threshold (a small-determination number) within the predetermined time period. As an example, in Embodiment 3, the parameter change unit 12c determines that the large-determination result has been obtained at each time point within the predetermined time period when the large-determination number is greater than the small-determination number within the predetermined time period. On the other hand, the parameter change unit 12c determines that the small-determination result has been obtained at each time point within the predetermined time period when the small-determination number is greater than the large-determination number within the predetermined time period.

In a case of FIG. 10, the small-determination number is one, and the large-determination number is four, so that the parameter change unit 12c determines that the large-determination result has been obtained at each time point within the predetermined time period (five samples).

Figure 11:
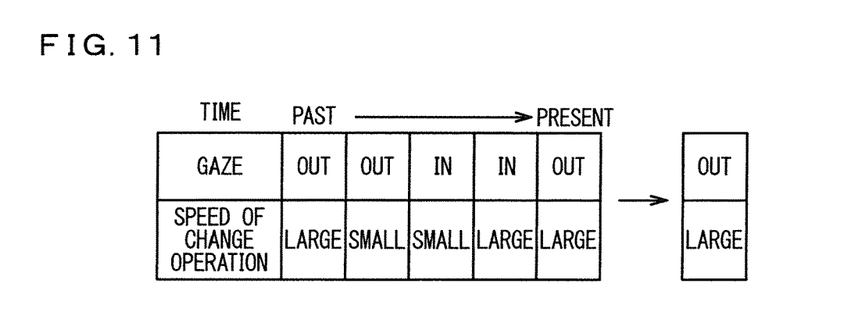
FIG. 11 is a diagram for describing change control performed by the display control apparatus according to Embodiment 3.
Figure 12:
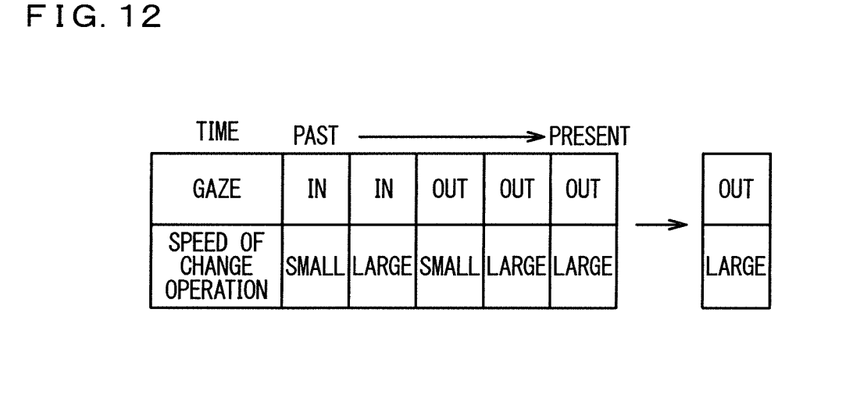
FIG. 12 is a diagram for describing change control performed by the display control apparatus according to Embodiment 3.

FIGS. 11 and 12 are each a diagram for describing the control of the change of the parameter per operation unit performed by the parameter change unit 12c according to Embodiment 3. In each of FIGS. 11 and 12, the in-determination number is two, and the out-determination number is three, so that the parameter change unit 12c determines that the out-determination result has been obtained at each time point within the predetermined time period (five samples). In each of FIGS. 11 and 12, the small-determination number is two, and the large-determination number is three, so that the parameter change unit 12c determines that the large-determination result has been obtained at each time point within the predetermined time period (five samples).

The parameter change unit 12c then controls the change of the parameter per operation unit based on the above-mentioned determination results as in Embodiment 2.

Summary of Embodiment 3

According to the display control apparatus 1 according to Embodiment 3 as described above, the change of the parameter per operation unit is controlled based on the number of times it is determined that the gaze is directed toward the display image and the number of times it is determined that the gaze is not directed toward the display image within the predetermined time period. According to such a configuration, the influence of a momentary change of a direction of the gaze on the control of the change of the parameter per operation unit can be suppressed.

Furthermore, according to Embodiment 3, the change of the parameter per operation unit is controlled based on the number of times it is determined that the speed of the change operation is equal to or greater than the threshold and the number of times it is determined that the speed of the change operation is smaller than the threshold within the predetermined time period. According to such a configuration, the influence of a momentary change of the speed of the change operation on the control of the change of the parameter per operation unit can be suppressed.

Modification of Embodiment 3

While the parameter change unit 12c controls the change of the parameter per operation unit based on the number of times including the in-determination number, the out-determination number, the large-determination number, and the small-determination number in Embodiment 3, the control is not limited to that described above.

For example, a time-series pattern of combinations of one of the in-determination result and the out-determination result and one of the large-determination result and the small-determination result within the predetermined time period may be associated with any of the combinations in advance, and stored. For example, a time-series pattern in FIG. 11 may be associated with a combination of the in-determination result and the small-determination result in advance, and stored, and a time-series pattern in FIG. 12 may be associated with a combination of the in-determination result and the large-determination result in advance, and stored.

Assume that a time-series pattern of combinations of the result of the gaze determination made by the gaze determination unit 12a and the result of the speed determination made by the speed determination unit 12b matches the time-series pattern in FIG. 11 in such a configuration. In such a case, the parameter change unit 12c may determine that the combination of the in-determination result and the small-determination result associated with the time-series pattern in FIG. 11 in advance has been obtained at each time point within the predetermined time period. The parameter change unit 12c may then control the change of the parameter per operation unit based on the in-determination result and the small-determination result as in Embodiment 2.

Assume that the time-series pattern of the combinations of the result of the gaze determination made by the gaze determination unit 12a and the result of the speed determination made by the speed determination unit 12b matches the time-series pattern in FIG. 12 in such a configuration. In such a case, the parameter change unit 12c may determine that the combination of the in-determination result and the large-determination result associated with the time-series pattern in FIG. 12 in advance has been obtained at each time point within the predetermined time period. The parameter change unit 12c may then control the change of the parameter per operation unit based on the in-determination result and the large-determination result as in Embodiment 2.

According to the display control apparatus 1 having a configuration as described above, the change of the parameter per operation unit is controlled based on the time-series pattern of the combinations of one of the in-determination result and the out-determination result and one of the large-determination result and the small-determination result within the predetermined time period. According to such a configuration, the change of the parameter per operation unit can be varied when the time-series pattern varies even if the in-determination number, the out-determination number, the large-determination result, and the small-determination result are the same as in FIGS. 11 and 12. The time-series pattern itself and a correspondence between the time-series pattern and any of the combinations may be changed as appropriate by machine learning using artificial intelligence and the like.

Modification 1 of Embodiments 1 to 3

The user accustomed to the change operation sometimes starts the change operation without directing the gaze toward the display image. If the skip change is used for the change of the parameter per operation unit in such a case, the user cannot appropriately change the parameter.

The change of the parameter per operation unit may therefore be constant regardless of the result of the gaze determination for a predetermined time period (e.g., one second) from the time the acquisition unit 11 starts acquisition of the change operation. According to such a configuration, the parameter can appropriately be changed even when the user accustomed to the change operation starts the change operation without directing the gaze toward the display image.

Modification 2 of Embodiments 1 to 3

When it is determined that the gaze is not directed toward the image, and the acquisition unit 11 acquires the change operation, the controller 12 may perform control to cause an unillustrated audio output apparatus to output audio based on a change of the image displayed by the display apparatus 51. When a famous place name is displayed by the display apparatus 51 due to the change operation, for example, the controller 12 may cause the audio output apparatus to audibly output the place name. When an initial letter of names of facilities and addresses displayed by the display apparatus 51 is changed from "A" to "B" due to the change operation, for example, the controller 12 may cause the audio output apparatus to audibly output "B". According to such a configuration, the user can know an image displayed by the display apparatus 51 without directing the gaze toward the display image.

Other Modifications

Figure 13:
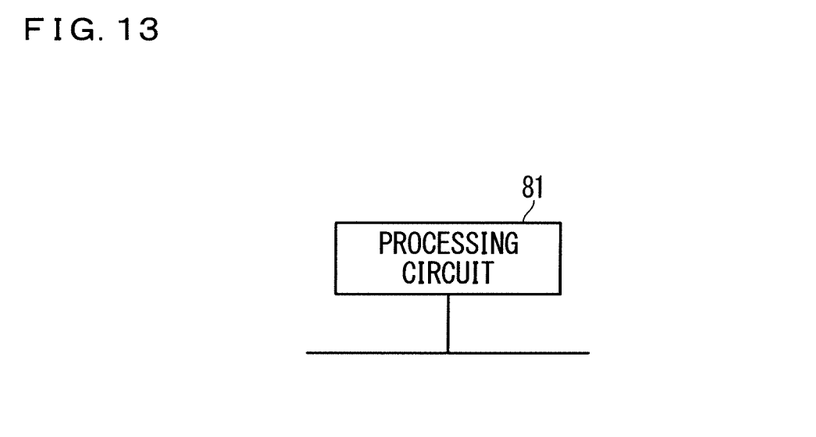
FIG. 13 is a block diagram showing a hardware configuration of a display control apparatus according to a modification.

The acquisition unit 11 and the controller 12 in FIG. 1 described above are referred to as the "acquisition unit 11 and the like" below. The acquisition unit 11 and the like are achieved by a processing circuit 81 shown in FIG. 13. That is to say, the processing circuit 81 includes: the acquisition unit 11 to acquire the change operation from the user, and acquire the gaze of the user; and the controller 12 to control the change of the parameter per operation unit based on the result of the gaze determination to determine whether the gaze is directed toward the image displayed by the display apparatus. Dedicated hardware or a processor to execute a program stored in a memory may be applied to the processing circuit 81. The processor corresponds to a central processing unit, a processing unit, an arithmetic unit, a microprocessor, a microcomputer, a digital signal processor (DSP), and the like, for example.

When the processing circuit 81 is the dedicated hardware, the processing circuit 81 corresponds to a single circuit, a composite circuit, a programmed processor, a parallel programmed processor, an application specific integrated circuit (ASIC), a field programmable gate array (FPGA), and a combination thereof, for example. The functions of the components such as the acquisition unit 11 and the like may be achieved by distributed processing circuits, or may collectively be achieved by a single processing circuit.

Figure 14:
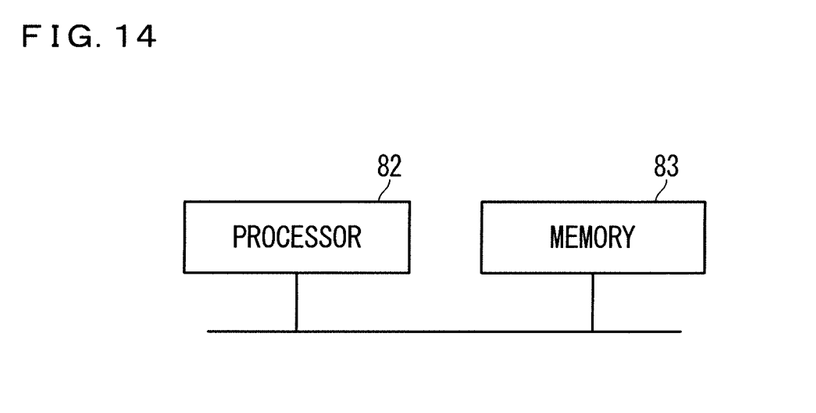
FIG. 14 is a block diagram showing a hardware configuration of a display control apparatus according to a modification.

When the processing circuit 81 is the processor, the functions of the acquisition unit 11 and the like are achieved by combination with software and the like. The software and the like correspond to software, firmware, or software and firmware, for example. The software and the like are described as the program, and stored in the memory. As shown in FIG. 14, a processor 82 applied to the processing circuit 81 reads and executes the program stored in a memory 83 to achieve the functions of the components. That is to say, the display control apparatus 1 includes the memory 83 to store the program which, when executed by the processing circuit 81, results in performance of steps including: acquiring the change operation from the user, and acquiring the gaze of the user; and controlling the change of the parameter per operation unit based on the result of the gaze determination to determine whether the gaze is directed toward the image displayed by the display apparatus. In other words, the program causes a computer to execute procedures or methods of the acquisition unit 11 and the like. The memory 83 herein may be, for example, a nonvolatile or volatile semiconductor memory, such as a random access memory (RAM), a read only memory (ROM), a flash memory, an erasable programmable read only memory (EPROM), and an electrically erasable programmable read only memory (EEPROM), a hard disk drive (HDD), a magnetic disk, a flexible disk, an optical disc, a compact disc, a mini disc, a digital versatile disc (DVD), a drive device thereof, and the like or any storage medium to be used in the future.

A configuration in which the functions of the acquisition unit 11 and the like are achieved either by the hardware or by the software and the like is described above. The configuration, however, is not limited to this configuration, and one of the acquisition unit 11 and the like may be achieved by the dedicated hardware, and the other may be achieved by the software and the like. For example, the function of the acquisition unit 11 can be achieved by the processing circuit 81 as the dedicated hardware, an interface, a receiver, and the like, and the function of the other component can be achieved by the processing circuit 81 as the processor 82 reading and executing the program stored in the memory 83.

As described above, the processing circuit 81 can achieve the above-mentioned functions by hardware, software, or a combination thereof.

The display control apparatus 1 described above is applicable to a display control system configured as a system by combining a vehicle device, such as a portable navigation device (PND), a navigation device, and a driver monitoring system (DMS), a communication terminal including a mobile terminal, such as a mobile phone, a smartphone, and a tablet, a function of an application installed on at least one of the vehicle device and the communication terminal, and a server as appropriate. In this case, the functions or the components of the display control apparatus 1 described above may be distributed among instruments constituting the system, or may be concentrated on any of the instruments.

Figure 15:
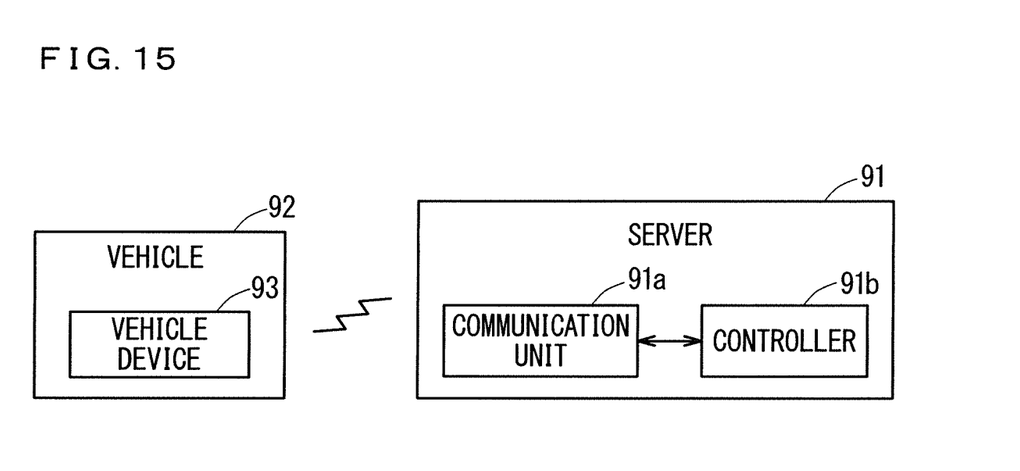
FIG. 15 is a block diagram showing a configuration of a server according to a modification.

FIG. 15 is a block diagram showing a configuration of a server 91 according to a modification. The server 91 in FIG. 15 includes a communication unit 91a and a controller 91b, and can wirelessly communicate with a vehicle device 93, such as the navigation device and the DMS, of a vehicle 92.

The communication unit 91a as the acquisition unit wirelessly communicates with the vehicle device 93 to receive the change operation and the gaze of the user acquired by the vehicle device 93.

The controller 91b has a similar function to the controller 12 in FIG. 1 by an unillustrated processor and the like of the server 91 executing a program stored in an unillustrated memory of the server 91. That is to say, the controller 91b generates a control signal to control the change of the parameter per operation unit based on the result of the gaze determination to determine whether the gaze is directed toward the image displayed by the display apparatus. The communication unit 91a transmits the control signal generated by the controller 91b to the vehicle device 93. According to the server 91 having such a configuration, a similar effect to that obtained by the display control apparatus 1 described in Embodiment 1 can be obtained.

Figure 16:
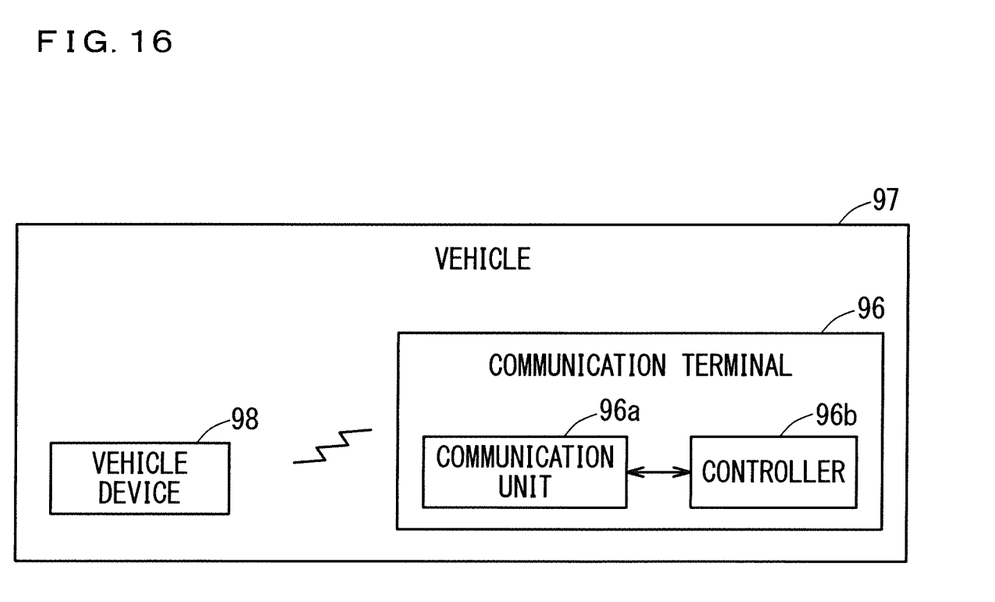
FIG. 16 is a block diagram showing a configuration of a communication terminal according to a modification.

FIG. 16 is a block diagram showing a configuration of a communication terminal 96 according to a modification. The communication terminal 96 in FIG. 16 includes a communication unit 96a similar to the communication unit 91a and a controller 96b similar to the controller 91b, and can wirelessly communicate with a vehicle device 98 of a vehicle 97. A mobile terminal, such as a mobile phone, a smartphone, and a tablet, carried by a driver of the vehicle 97 is applied to the communication terminal 96, for example. According to the communication terminal 96 having such a configuration, a similar effect to that obtained by the display control apparatus 1 described in Embodiment 1 can be obtained.

Embodiments and Modifications can freely be combined with each other, and can be modified or omitted as appropriate.

The foregoing description is in all aspects illustrative and not restrictive. It is understood that numerous unillustrated modifications can be devised.

EXPLANATION OF REFERENCE SIGNS 1 display control apparatus, 11 acquisition unit, 12 controller, 51 display apparatus.

The invention claimed is:

1. A display control apparatus to control a display apparatus, the display control apparatus comprising:
  acquisition circuitry to acquire a change operation to change a parameter used for an image displayed by the display apparatus from a user, and acquire a gaze of the user; and
  a controller to control a change of the parameter per operation unit being a unit of the change operation based on a result of gaze determination to determine whether the gaze is directed toward the image displayed by the display apparatus, wherein
  the controller controls the change of the parameter per operation unit based on the result of the gaze determination and a result of speed determination to determine whether a speed of the change operation is equal to or greater than a predetermined threshold; and
  when the change operation is performed, the controller controls the movement of the image displayed by the display apparatus or the change of the number displayed by the display apparatus using the changed parameter per the operation unit.

2. The display control apparatus according to claim 1, wherein
  the change of the parameter per operation unit when it is determined that the gaze is not directed toward the image, and the speed of the change operation is equal to or greater than the threshold is greater than the change of the parameter per operation unit when it is not determined that the gaze is not directed toward the image, and the speed of the change operation is equal to or greater than the threshold.

3. The display control apparatus according to claim 1, wherein
  the speed determination is made at a plurality of time points within a predetermined time period, and
  the controller controls the change of the parameter per operation unit based on the number of times it is determined that the speed of the change operation is equal to or greater than the threshold and the number of times it is determined that the speed of the change operation is smaller than the threshold within the predetermined time period.

4. The display control apparatus according to claim 1, wherein
  the gaze determination and the speed determination are made at a plurality of time points within a predetermined time period, and
  the controller controls the change of the parameter per operation unit based on a time-series pattern of combinations of one of a determination result that the gaze is directed toward the image and a determination result that the gaze is not directed toward the image and one of a determination result that the speed of the change operation is equal to or greater than the threshold and a determination result that the speed of the change operation is smaller than the threshold within the predetermined time period.

5. The display control apparatus according to claim 1, wherein
  the change of the parameter per operation unit is constant regardless of the result of the gaze determination for a predetermined time period from the time the acquisition circuitry starts acquisition of the change operation.

6. The display control apparatus according to claim 1, wherein when it is determined that the gaze is not directed toward the image, and the acquisition circuitry acquires the change operation, the controller performs control to cause an audio output apparatus to output audio based on a change of the image displayed by the display apparatus.

7. A display control apparatus to control a display apparatus, the display control apparatus comprising:

acquisition circuitry to acquire a change operation to change a parameter used for an image displayed by the display apparatus from a user, and acquire a gaze of the user; and a controller to control a change of the parameter per operation unit being a unit of the change operation based on a result of gaze determination to determine whether the gaze is directed toward the image displayed by the display apparatus, wherein the gaze determination is made at a plurality of time points within a predetermined time period, the controller controls the change of the parameter per operation unit based on the number of times it is determined that the gaze is directed toward the image and the number of times it is determined that the gaze is not directed toward the image within the predetermined time period; and when the change operation is performed, the controller controls the movement of the image displayed by the display apparatus or the change of the number displayed by the display apparatus using the changed parameter per the operation unit.

8. The display control apparatus according to claim 7, wherein the change of the parameter per operation unit is constant regardless of the result of the gaze determination for a predetermined time period from the time the acquisition circuitry starts acquisition of the change operation.

9. The display control apparatus according to claim 7, wherein when it is determined that the gaze is not directed toward the image, and the acquisition circuitry acquires the change operation, the controller performs control to cause an audio output apparatus to output audio based on a change of the image displayed by the display apparatus.

10. A display control method to control a display apparatus, the display control method comprising:

acquiring a change operation to change a parameter used for an image displayed by the display apparatus from a user, and acquiring a gaze of the user; and controlling a change of the parameter per operation unit being a unit of the change operation based on a result of gaze determination to determine whether the gaze is directed toward the image displayed by the display apparatus, wherein the change of the parameter per operation unit is controlled based on the result of the gaze determination and a result of speed determination to determine whether a speed of the change operation is equal to or greater than a predetermined threshold; and when the change operation is performed, the display control method controls the movement of the image displayed by the display apparatus or the change of the number displayed by the display apparatus using the changed parameter per the operation unit.

* * * * *